United States Patent

[11] 3,626,053

| [72] | Inventor | Peter H. Hofer<br>Berkeley Heights, N.J. |
|---|---|---|
| [21] | Appl. No. | 714,205 |
| [22] | Filed | Mar. 19, 1968 |
| [45] | Patented | Dec. 7, 1971 |
| [73] | Assignee | Union Carbide Corporation |

[54] METHOD OF MOLDING THERMOPLASTIC SHEET MATERIAL
8 Claims, 3 Drawing Figs.

[52] U.S. Cl. ................................................ 264/322,
264/230, 264/294
[51] Int. Cl. ...................................................... B29c 3/00
[50] Field of Search ............................................ 264/322,
230, 294–296, 292

[56] References Cited
UNITED STATES PATENTS

| 2,045,471 | 6/1936 | Kasen | 264/322 X |
| 2,433,643 | 12/1947 | Beach | 264/322 |
| 2,532,501 | 12/1950 | Johnson | 264/322 X |
| 2,595,970 | 5/1952 | McGill | 264/322 X |
| 2,781,552 | 2/1957 | Gray | 264/230 X |
| 3,300,559 | 1/1967 | Baehr | 264/322 X |
| 3,439,078 | 4/1969 | Whiteford | 264/322 X |
| 2,680,882 | 6/1954 | Hirschmann | 264/292 |

*Primary Examiner*—Robert F. White
*Assistant Examiner*—Richard R. Kucia
*Attorneys*—Paul A. Rose, Aldo J. Cozzi and James C. Arvantes ABSTRACT: This invention relates to a method of molding thermoplastic sheet material by heating the thermoplastic sheet material to its softened state, forming the heat softened material into a shaped article and then allowing the shaped article to undergo a shrinkage with respect to its thickness while maintaining the length and width of the shaped article substantially constant.

PATENTED DEC 7 1971　　　　　　　　　　　　　　　3,626,053
FIG.1
OVEN 3
THERMOPLASTIC SHEET MATERIAL 1
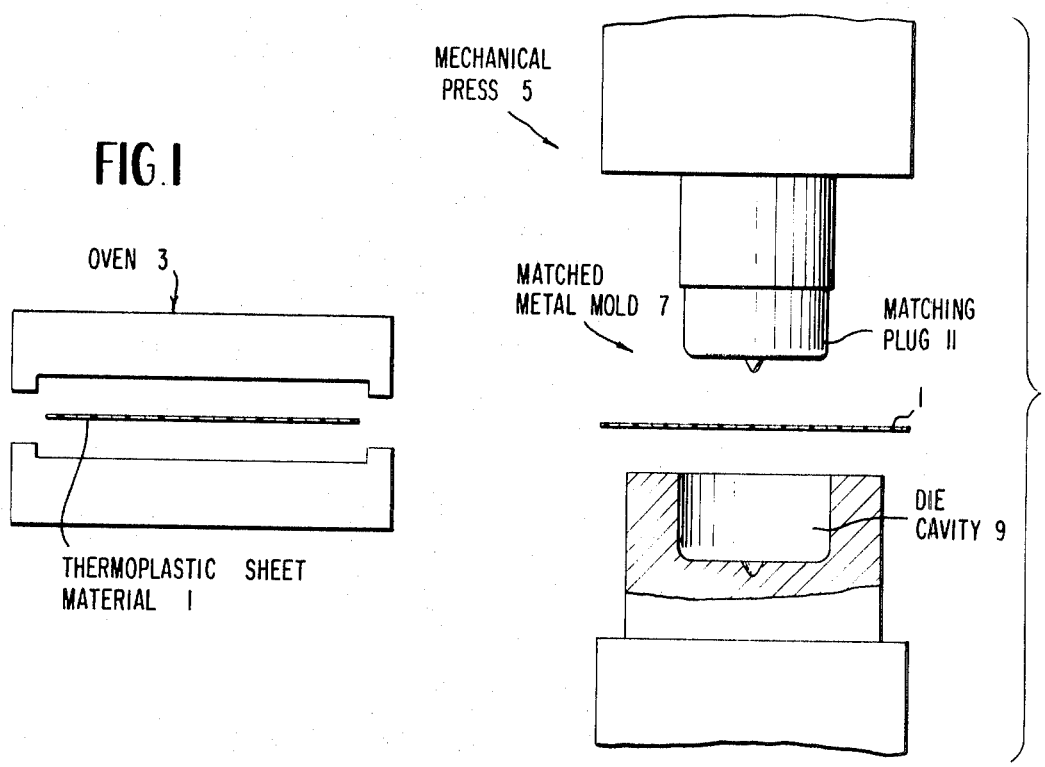
MECHANICAL PRESS 5
MATCHED METAL MOLD 7
MATCHING PLUG 11
DIE CAVITY 9
FIG.2
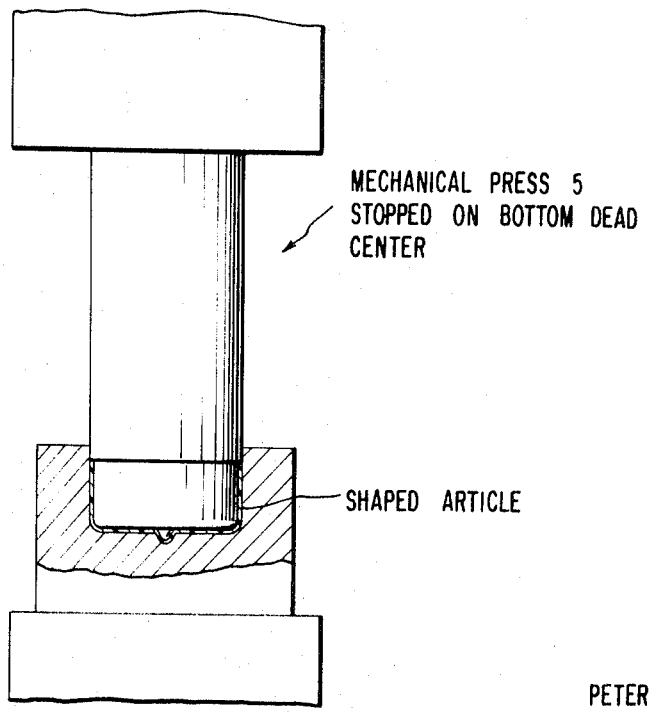
MECHANICAL PRESS 5 STOPPED ON BOTTOM DEAD CENTER
FIG.3
SHAPED ARTICLE
INVENTOR.
PETER H. HOFER
BY
ATTORNEY

METHOD OF MOLDING THERMOPLASTIC SHEET MATERIAL

This invention relates to a method of molding thermoplastic material. More particularly, this invention relates to a method of molding glass-reinforced thermoplastic sheet material wherein relatively short molding cycles can be used to produce shaped articles of desired configuration which are characterized by the absence of undesirable built in strains and stresses common to thermoplastic articles produced by such currently known molding methods as injection molding.

As a general rule, thermoplastic materials are formed into shaped articles by one of two basic methods, either by injection molding or by vacuum forming. It has been found, however, that neither one of these two methods has been completely successful in the production of relatively thin articles of desired configuration which are substantially free of undesirable built-in strains and stresses. As an illustration, during the production of a shaped article by the injection molding of thermoplastic material, the thermoplastic material and consequently the ultimate shaped article is unidirectionally oriented in the direction of flow of the thermoplastic material as it passes through the gate of the injection mold into the mold cavity. This results in the production of a shaped article which has improved strengths in the direction of orientation with a more or less corresponding decrease of physical strength in the direction of nonorientation. Consequently, the built-in strains and stresses of the shaped article are accentuated in the direction of nonorientation. As a result, the shaped article is subject to easy crack or rupture along its axis of nonorientation when subjected to an external blow.

Attempts to improve the physical strengths of injection molded articles by the addition, to the thermoplastic materials from which the injection molded articles are to be prepared, of reinforcing material such as continuous glass fibers and the like has not proved to be particularly successful. Difficulties have been encountered in attempting to force such reinforced thermoplastic material through the narrow opening of the gate of the injection mold into the mold cavity without undesirable fracture of the glass fibers into very small particles.

Utilizing the vacuum forming technique of forming thermoplastic material into shaped articles has also presented a number of problems. A particularly troublesome problem, especially from a commercial standpoint, is the relatively long cycles required in order to produce a relatively thick vacuum formed article, generally on the order of about 1 to about 3 minutes. Also, it is not possible to control and vary the thickness of a vacuum formed article as its ultimate thickness is determined by the initial thickness of the thermoplastic sheet from which it was vacuum formed. Furthermore, it is very difficult to control the uniformity of thickness of a vacuum formed thermoplastic article in view of the fact that during the vacuum forming operation, the thermoplastic material tends to "thin out."

The present invention provides for the molding of thermoplastic material, both reinforced and unreinforced, by a method which is free of the undesirable features described with respect to injection molding and vacuum forming. The present invention provides for the molding of thermoplastic sheet material by an operation of only a few seconds duration which results in the production of shaped articles of desired configuration characterized by the absence of undesirable built-in strains and stresses.

According to the present invention thermoplastic sheet material is formed into a shaped article by: heating the thermoplastic material to its softened state, wherein the thermoplastic material will flow under pressure, forming the heat-softened material into a shaped article and then allowing the shaped article to undergo a shrinkage with respect to its thickness while maintaining the length and width of the shaped article substantially constant.

Reference is now made to the accompanying schematic drawing, depicting FIGS. 1–3, which, in conjunction with the description which follows will further describe the present invention.

Thermoplastic sheet material 1 is fed from a convenient source of supply (not shown) into an oven 3 (FIG. 1) wherein it is heated to a temperature such that it is in a softened state and will flow under pressure. As a general rule, the heat in oven 3 is furnished by a convenient number of infrared lamps (not shown). The dwell time of thermoplastic sheet 1 in oven 3 will depend upon the nature of the thermoplastic of sheet 1, the thickness of sheet 1 and the intensity of the heat in oven 3.

After thermoplastic sheet 1 reaches its heat-softened state, as described, it is fed by any convenient means from oven 3 to a mechanical press 5 having a matched metal mold 7 made up of an open die cavity 9 and a matching plug 11 (FIG. 2). The operation of mechanical press 5 is effected by suitable electrical means (not shown).

Thermoplastic sheet 1 is fed by any suitable means (not shown) to matched metal mold 7 and positioned between die cavity 9 and matching plug 11 by being placed on top of die cavity 9, in die cavity 9, on top of plug 11 or intermediate between die cavity 9 and plug 11.

With thermoplastic sheet 1 in position, as described, mechanical press 5 is operated to close matched metal mold 7 and to stop substantially on bottom dead center (FIG. 3). This manner of operating mechanical press 5 results in molding thermoplastic sheet 1 into a shaped article of desired configuration and allows for the shrinkage of the shaped article with respect to its thickness while the length and width of the shaped article are maintained substantially constant.

After the shaped article has undergone a shrinkage with respect to its thickness, during which time pressure is maintained on the article by plug 11, mechanical press 5 is engaged opening up matched metal mold 7. The shaped article can then be removed from die cavity 9.

The actual length of time during which mechanical press 5 is stopped on substantially bottom dead center is sufficient to allow the shaped article to cool to a point wherein it will maintain its shape on being handled. This time will depend upon the thermoplastic nature of the sheet being molded, its thickness, as well as the operating temperatures of the matched metal mold.

As a rule, matched metal mold 7 is at about room temperature although higher or lower temperatures can be utilized.

The thermoplastic sheet which is fed to mechanical press 5 can be oversized, undersized or the same size with respect to die cavity 9. It is preferred that the thermoplastic sheet be undersized as this results in a shaped article which does not require any post-trimming.

Also, if desired separate material, usually in the form of a sheet can be utilized simultaneously in the molding operation in conjunction with the primary thermoplastic sheet by being positioned in mechanical press 5 in a manner as described with thermoplastic sheet 1, to provide a laminated shaped article. This separate or additional material can be a flat thermoplastic sheet, a foamed thermoplastic sheet and the like. Rather than using a thermoplastic sheet, die cavity 9 can be provided with a thermoplastic coating which transfers to the shaped article during the molding operation. It is to be understood that a plurality of these materials can be used to provide a multilayer thermoplastic shaped article.

Illustrative of thermoplastics which can be used in accordance with the present invention are vinyl resins, illustrative of which are homopolymers of a monomer having the formula:

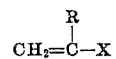

wherein X is a halogen atom, e.g., chlorine, bromine, iodine or fluorine and R is hydrogen or one of the above-name halogens; and polymers of such monomers and at least one other monoethylenically unsaturated monomer such as vinyl acetate, acrylonitrile, styrene and the like. Other suitable thermoplastics are the following: polystyrene, copolymers of styrene and acrylonitrile, polyethylene, chlorinated polyethylene, polypropylene, polycarbonates, that is, thermoplastics containing the repeating units:

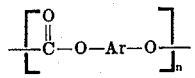

wherein Ar is the residue of a dihydric phenol and $n$ is an integer preferably greater than 100, polyhydroxyethers, that is thermoplastics containing the repeating unit:

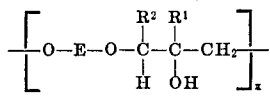

wherein E is the nucleus of a dihydric polynuclear phenol and $R^1$ and $R^2$ are either hydrogen or methyl and $x$ is an integer preferably greater than 100, polyurethanes, that is thermoplastics containing the repeating unit:

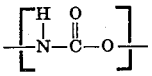

polysulfones, that is thermoplastics containing the repeating unit:

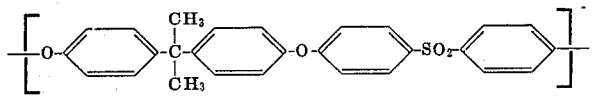

and other like thermoplastic resins.

To the thermoplastics can be added such materials as reinforcements exemplary of which are glass fibers of short length, long length or of continuous length; fillers such as asbestos, talc and the like; pigments such as carbon black; antioxidants as well as other additives which are well known in the art.

As the general rule, glass fibers are used in amounts of about 10 percent by weight to about 80 percent by weight and preferably about 40 percent by weight to about 60 percent by weight based on the combined weight of the thermoplastic and the glass fibers.

The thermoplastic material can be formed into sheet form by any one of a number of well-known methods, as for example, by extrusion.

The mechanical presses used to mold or stamp out shaped articles in accordance with this invention can be any one of a number of well-known and readily available mechanical presses such as crank type presses, eccentric gear type presses and hydraulically operated mechanical toggle presses.

The examples which follow further illustrate the present invention and are not intended to limit the scope thereof in any manner.

EXAMPLE 1

A No. 3A, 45 ton Niagara Press, a crank type press was used to mold boxes from thermoplastic sheet material of: a copolymer of styrene-acrylonitrile containing 20 percent by weight combined acrylonitrile; polypropylene and a copolymer of vinylchloride-vinylacetate containing 40 percent by weight combined vinyl chloride. Each sheet contained 40 percent by weight glass fibers and was 0.100 inch thick.

Each sheet was subjected to a heating cycle as noted below prior to being fed into the press.
 copolymer of styrene-acrylonitrile = 40 seconds to 450° F.
 polypropylene = 40 seconds to 435° F.
 copolymer of vinylchloride-vinylacetate—50 seconds to 440° F.

The press operated at 22 strokes per minute with a pressure as noted below with respect to each sheet.
 copolymer of styrene-acrylonitrile = 1,200 p.s.i.
 polypropylene = 800 p.s.i.
 copolymer of vinylchloride-vinyl acetate = 1,500 p.s.i.

The press was stopped on bottom dead center for the time indicated below then reengaged, opening the matched metal mold and allowing for removal of the shaped articles. During the molding cycle the die cavity was at a temperature of 75° F. and the matching plug was at a temperature of 72° F.
 copolymer of styrene-acrylonitrile = 6.4 seconds
 polypropylene = 8.5 seconds
 copolymer of vinylchloride-vinylacetate = 9.2 seconds Excellent quality boxes with a thickness of 0.095 inch were produced. No post-triming was necessary.

EXAMPLE 2

A 140 ton Bliss Press, a crank type press, was used to mold various pieces from polypropylene sheet material 0.090 inch thick containing 40 percent by weight glass fibers.

The piece which was molded, the heating cycle, operating pressure of the press, the time during which the press was stopped on bottom dead center, are indicated below.
 louvered automobile panel = 6 inches by 13½ inches by 27½ inches with a thickness of 0.075 inch
 heating cycle = 45 seconds to 428° F.
 operating pressure = 800 p.s.i.
 time-bottom dead center—6.4 seconds

EXAMPLE 3

Example 2 was repeated using a talcum filled polypropylene sheet, having a thickness of 0.019 inch, as an overlay to the basic or primary polypropylene sheet with the result that the talcum filled sheet was laminated to the primary polypropylene sheet during the molding operation. The talcum filled sheet was heated to a temperature of 320° F. and fed to the mold cavity over the primary polypropylene sheet.

The thickness of the finished piece was 0.092 inch.

What is claimed is:

1. A method of molding thermoplastic material which comprises heating a thermoplastic sheet material, which undergoes shrinkage on cooling, to its softened state wherein the thermoplastic material will flow under pressure, feeding the heated thermoplastic sheet to a matched mold of a mechanical press, activating said mechanical press to close said matched mold, deactivating said mechanical press to stop said press on substantially bottom dead center whereby the thermoplastic material conforms to the shape of the mold, allowing said mechanical press to remain on substantially bottom dead center until the shaped article in the mold undergoes a shrinkage with respect to its thickness while the length and width thereof are maintained substantially constant and the shaped article is cooled to a point where it will maintain its shape on being handled, activating said mechanical press to open the said matched mold and recovering the said cooled article.

2. A method as defined in claim 1 wherein the thermoplastic sheet contains glass fibers.

3. A method as defined in claim 1 wherein the thermoplastic sheet contains about 10 to about 80 percent by weight glass fibers.

4. A method as defined in claim 1 wherein the thermoplastic sheet contains about 40 to about 60 percent by weight glass fibers.

5. A method as defined in claim 2 wherein the thermoplastic sheet material is a copolymer of styrene and acrylonitrile.

6. A method as defined in claim 2 wherein the thermoplastic sheet material is polypropylene.

7. A method as defined in claim 2 wherein the theremoplastic sheet material is a copolymer of vinyl chloride and vinyl acetate.

8. A method as defined in claim 1 wherein at least one additional thermoplastic member is placed in contact with the thermoplastic sheet material prior to the molding of the thermoplastic sheet material into a shaped article.

* * * * *